(12) United States Patent
Adunka et al.

(10) Patent No.: US 7,597,578 B2
(45) Date of Patent: Oct. 6, 2009

(54) MOUNTING DEVICE HAVING DE-ENERGIZED AND ENERGIZED POSITIONS FOR A SWITCHGEAR MOUNTED THEREON

(75) Inventors: Robert Adunka, Sulzbach-Rosenberg (DE); Berthold Heldmann, Freudenberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/662,072

(22) PCT Filed: Sep. 6, 2005

(86) PCT No.: PCT/EP2005/054385
§ 371 (c)(1),
(2), (4) Date: Mar. 7, 2007

(87) PCT Pub. No.: WO2006/027355
PCT Pub. Date: Mar. 16, 2006

(65) Prior Publication Data
US 2007/0263345 A1 Nov. 15, 2007

(30) Foreign Application Priority Data
Sep. 8, 2004 (DE) .................. 10 2004 043 469

(51) Int. Cl.
*H01R 13/627* (2006.01)
(52) U.S. Cl. .................. 439/357; 361/636; 200/295
(58) Field of Classification Search .............. 439/752, 439/354, 357, 358; 361/636, 640; 200/295, 200/296
See application file for complete search history.

(56) References Cited

U.S. PATENT DOCUMENTS

| 3,093,773 | A |   | 6/1963  | Cole |
|-----------|---|---|---------|------|
| 4,376,563 | A | * | 3/1983  | Margrave et al. ............ 439/358 |
| 4,694,379 | A |   | 9/1987  | Unger |
| 5,894,405 | A |   | 4/1999  | Fleege |
| 6,122,160 | A |   | 9/2000  | Hannula |
| 6,196,858 | B1| * | 3/2001  | Matsumoto et al. ......... 439/354 |
| 6,317,311 | B1|   | 11/2001 | Middlehurst |
| 6,596,956 | B1| * | 7/2003  | Czarnecki ................... 200/552 |

FOREIGN PATENT DOCUMENTS

| CN | 1320987       | 11/2001 |
| DE | 40 21 824 A1  | 1/1992  |
| DE | 42 42 704 A1  | 6/1994  |
| DE | 197 38 705 A1 | 3/1999  |
| DE | 297 19 479 U1 | 5/1999  |

(Continued)

OTHER PUBLICATIONS

Office Action dated May 8, 2009 issued in corresponding Chinese Application No. 2005800301811.

*Primary Examiner*—Briggitte R Hammond
*Assistant Examiner*—Vanessa Girardi
(74) *Attorney, Agent, or Firm*—Harness, Dickey & Pierce, P.L.C.

(57) ABSTRACT

A mounting device includes a switchgear, which is mounted thereon and which can, via plug contacts, be brought into contact with mating plug contacts of the mounting device. At least one first retaining device(s) holds the switchgear in a defined stationary position in which the plug contacts do not come in contact with the mating plug contacts.

12 Claims, 2 Drawing Sheets

FOREIGN PATENT DOCUMENTS

| | | |
|---|---|---|
| DE | 100 03 349 A1 | 8/2001 |
| DE | 100 61 943 C1 | 6/2002 |
| DE | 102 15 500 A1 | 10/2003 |
| EP | 1 029 390 | 9/2001 |
| EP | 0 917 751 B1 | 2/2002 |
| ES | 2 076 075 A2 | 10/1995 |
| FR | 2 503 450 A | 10/1982 |

* cited by examiner

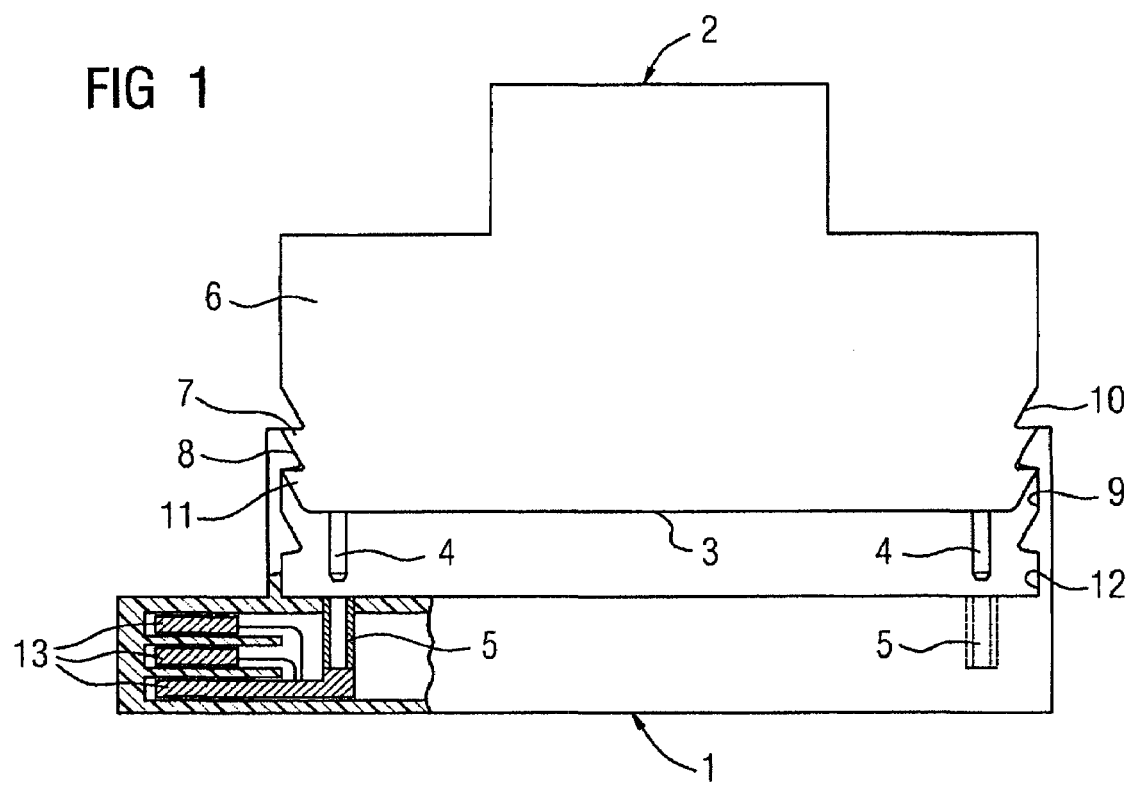
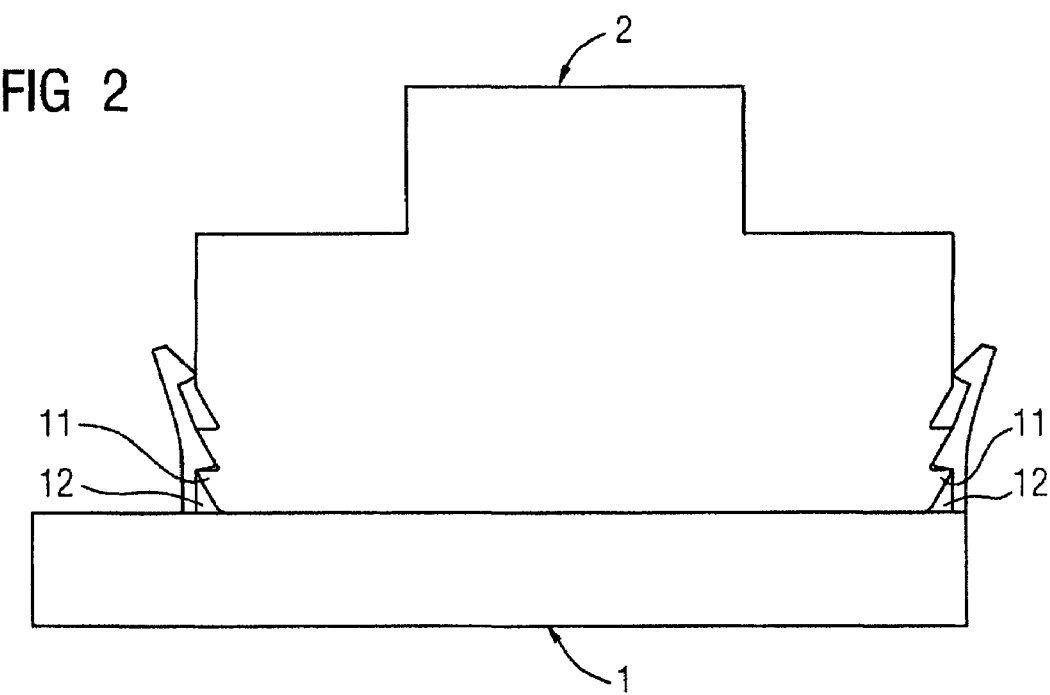

MOUNTING DEVICE HAVING DE-ENERGIZED AND ENERGIZED POSITIONS FOR A SWITCHGEAR MOUNTED THEREON

PRIORITY STATEMENT

This application is the national phase under 35 U.S.C. 317 371 of PCT International Application No. PCT/EP2005/054385 which has an International filing date of Sep. 6, 2005, which designated the United States of America and which claims priority on German Patent Application number 10 2004 043 469.7 filed Sep. 8, 2004, the entire contents of which are hereby incorporated herein by reference.

FIELD

Embodiments of the invention generally relate to a mounting device having an electrical switchgear mounted thereon.

BACKGROUND

European patent EP 1 029 390 discloses a load feeder that is composed of a contactor and a power breaker and is mounted on an intermediate support. The intermediate support is provided with a channel in which plug contacts lie, which are connected to the feeder assembly via electrical lines for supplying power. By placing the intermediate support containing the load feeder on a base support, the plug contacts make contact with mating plug contacts in said base support. Contact is made at the same time as the intermediate support is mounted on the base support.

French patent FR 25 03 450 and U.S. Pat. No. 3,093,773 disclose a mounting device having an electrical switchgear mounted thereon. The switchgear comprises plug contacts for making plug-in contact with mating plug contacts provided on the mounting device, in order to connect the switchgear to the power supply circuit. The mounting device and the switchgear are provided with locating means, which hold the switchgear in a defined parked position, without the plug contacts making contact with the mating contacts.

SUMMARY

A mounting device, in at least one embodiment, includes an improved design in terms of mounting and contact-making.

A safe state is achieved by this pre-latching of the switchgear unit in the parked position, in which loads connected to the switchgear are de-energized, and hence it is possible to perform operations on these loads, or e.g. replace the loads, without risk.

A particularly advantageous, e.g. simple and low-cost, solution is obtained in at least one embodiment, when at least one first locating device(s) is designed as a first latching device for mutual latching between the switchgear and the mounting device.

The switchgear can be mounted particularly easily if the mounting device has at least one guidance device, used to guide the switchgear into the parked position as it is being plugged in.

In at least one embodiment, the contact position is engaged by at least one suitable locating device as a secured state. The switchgear must first pass through the parked position to reach this state.

In at least one embodiment, contact can be made particularly easily, wherein the plug contacts and the mating plug contacts are arranged and orientated such that they can make contact by the plug-in movement being substantially at right angles to the rear wall of the switchgear.

BRIEF DESCRIPTION OF THE DRAWINGS

Example embodiments of the invention are described in more detail below with reference to the drawings, in which:

FIG. 1 shows a first mounting device according to an embodiment of the invention having electrical switchgear mounted thereon in the state where contact is not made, FIG. 2 shows the mounting device according to an embodiment of the invention shown in FIG. 1 having electrical switchgear mounted thereon to which contact is made.

DETAILED DESCRIPTION OF THE EXAMPLE EMBODIMENTS

Figure 3:
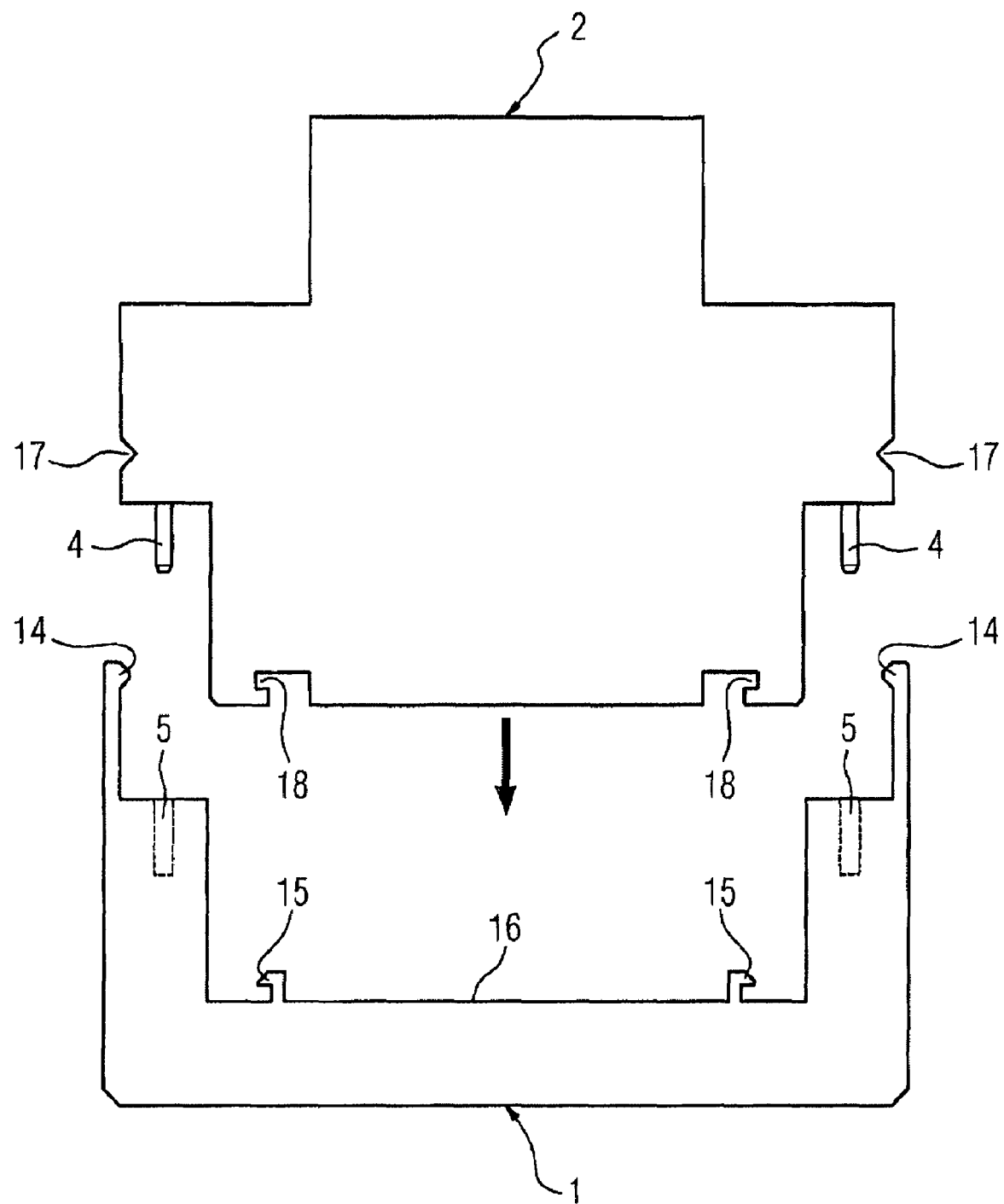
FIG. 3 shows a second mounting device according to an embodiment of the invention and an electrical switchgear that can be mounted on it and plugged in to make contact.

FIG. 1 shows a mounting device 1 and an electrical switchgear 2 mounted on it. The switchgear 2 includes plug contacts, which are designed as contact pins 4 protruding from the rear wall 3 of the switchgear 1, and which are used to make plug-in contact with sockets as mating contacts on the mounting device 1. The sockets 5 are integrated in the mounting device 1 so as to be shockproof. The mounting device 1 and the switchgear 2, preferably its enclosure 6, are equipped with at least one first latching device(s), as at least one first locating device, in the form of latches 7 and matching notches 8, which hold the switchgear 2 in a defined parked position as shown in FIG. 1, without the plug contacts 4 making contact with the mating plug contacts 5.

To guide the switchgear 2 when it is being plugged into the parked position, the mounting device 1 is equipped with at least one guidance device(s), which in the present example embodiment are provided by internal walls 9 along which the switchgear 2 slides, guided by its sidewalls 10.

In addition, the mounting device 1 and the switchgear 2 include, for example on the enclosure 6 of the switchgear, at least one second locating device(s), designed as at least one second latching device(s) and include latches 11 and matching notches 12, which hold the switchgear 2 in a defined contact position as shown in FIG. 2, in which the plug contacts 4 make contact with the mating plug contacts 5, where the contact position can only be reached after passing through the parked position.

The mating plug contacts 5 are electrically connected to a power distribution system that includes busbars 13 and is integrated in the mounting device 1.

The plug contacts 4 and the mating plug contacts 5 are arranged and orientated such that they can make contact by the plug-in movement being substantially at right angles to the rear wall 3 of the switchgear 2.

In the further example embodiment shown in FIG. 3, the mounting device 1 is provided with latching hooks 14 for pre-latching the switchgear 2 in the parked position, and with further latching hooks 15 on the internal wall 16 for latching the switchgear 2 in the state where contact is made. The switchgear 2, which can be plugged in to make contact, includes on its enclosure 6 the notches 17, 18 designed to match latching hooks 14, 15. The plug contacts 4 are here arranged on a level that is stepped back from the rear wall 3 of the switchgear unit, which creates alternative configuration options for the mounting device 1, in particular for accommodating the power distribution system.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A mounting device including an electrical switchgear mounted thereon having an enclosure, the mounting device comprising:
   mating plug contacts, wherein the switchgear includes plug contacts; and
      at least one first locating device formed on the enclosure of the switchgear to hold the switchgear in a defined parked position, without the plug contacts making contact with the mating plug contacts, to isolate the switchgear both from a supply circuit and from a connected load wherein the plug contacts protrude from the enclosure of the switchgear.

2. The mounting device as claimed in claim 1, wherein the at least one first locating device is designed as at least one first latching device to mutually latch between the switchgear and the mounting device.

3. The mounting device as claimed in claim 1, further comprising:
   at least one guidance device to guide the switchgear into the parked position as it is being plugged in.

4. The mounting device as claimed in claim 1, further compnsing:
   at least one second locating device to hold the switchgear in a defined contact position, in which the plug contacts make contact with the mating plug contacts, wherein the contact position is only reachable after passing through the parked position.

5. The mounting device as claimed in claim 1, wherein the mating plug contacts are connected to a power distribution system, integrated in the mounting device.

6. The mounting device as claimed in claim 1, wherein the mating plug contacts are integrated in the mounting device so as to be shockproof.

7. The mounting device as claimed in claim 1, wherein the plug contacts and the mating plug contacts are arranged and orientated to make contact by the plug-in movement being substantially at right angles to a rear wall of the switchgear.

8. The mounting device as claimed in claim 1, wherein the first locating device includes a protruding portion that extends from a surface of a mounting portion, the protruding portion having at least one latch extending from a side surface.

9. The mounting device as claimed in claim 8, wherein the first locating device further includes at least one notch portion formed in a sidewall of the enclosure to receive the at least one latch.

10. A mounting device including an electrical switchgear mounted thereon having an enclosure, the mounting device comprising:
   mating plug contacts, wherein the switchgear includes plug contacts;
      at least one first locating device formed on the enclosure of the switchgear to hold the switchgear in a defined parked position, without the plug contacts making contact with the mating plug contacts, to isolate the switchgear both from a supply circuit and from a connected load; and
      at least one second locating device to hold the switchgear in a defined contact position, in which the plug contacts make contact with the mating plug contacts, wherein the contact position is only reachable after passing through the parked position and wherein the at least one second locating device is designed as at least one second latching device, wherein
         the at least one first locating device is designed as at least one first latching device to mutually latch between the switchgear and the mounting device.

11. The mounting device as claimed in claim 10, wherein the at least one second locating device is on the enclosure of the switchgear.

12. A mounting device including an electrical switchgear mounted thereon having an enclosure, the mounting device comprising:
   mating plug contacts, wherein the switchgear includes plug contacts; and
      at least one first locating device formed on the enclosure of the switchgear to hold the switchgear in a defined parked position, without the plug contacts making contact with the mating plug contacts, to isolate the switchgear both from a supply circuit and from a connected load, wherein the plug contacts and the mating plug contacts are arranged and orientated to make contact by the plug-in movement being substantially at right angles to a rear wall of the switchgear.

* * * * *